Feb. 26, 1952 E. BOBARD 2,587,435
MOWING MACHINE
Filed March 15, 1945 4 Sheets-Sheet 1
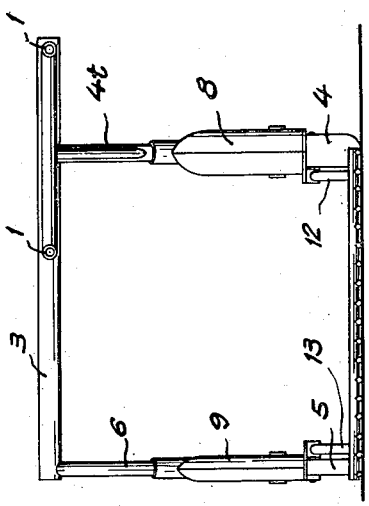
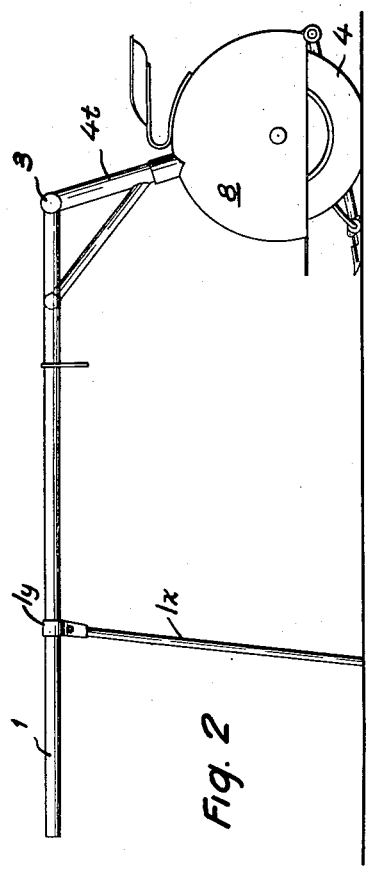
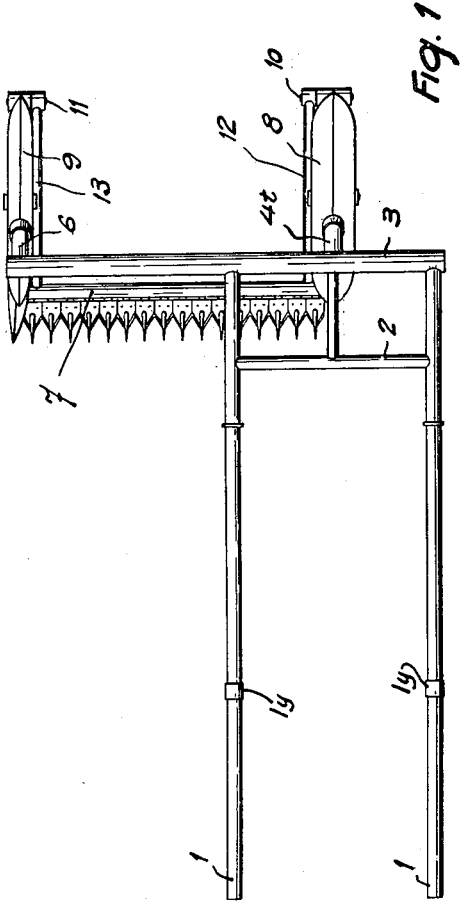
Inventor
Emile Bobard
by his attorneys
Howson and Howson Feb. 26, 1952 — E. BOBARD — 2,587,435
MOWING MACHINE
Filed March 15, 1945 — 4 Sheets-Sheet 2
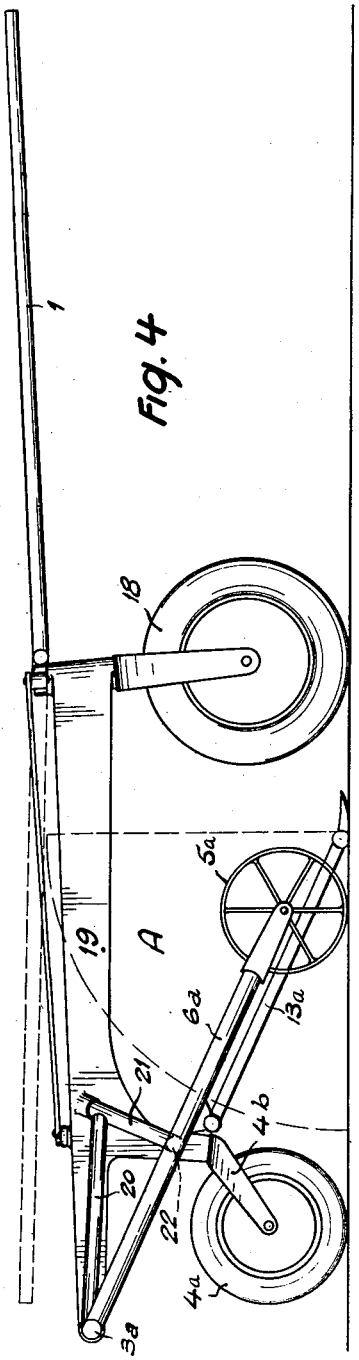
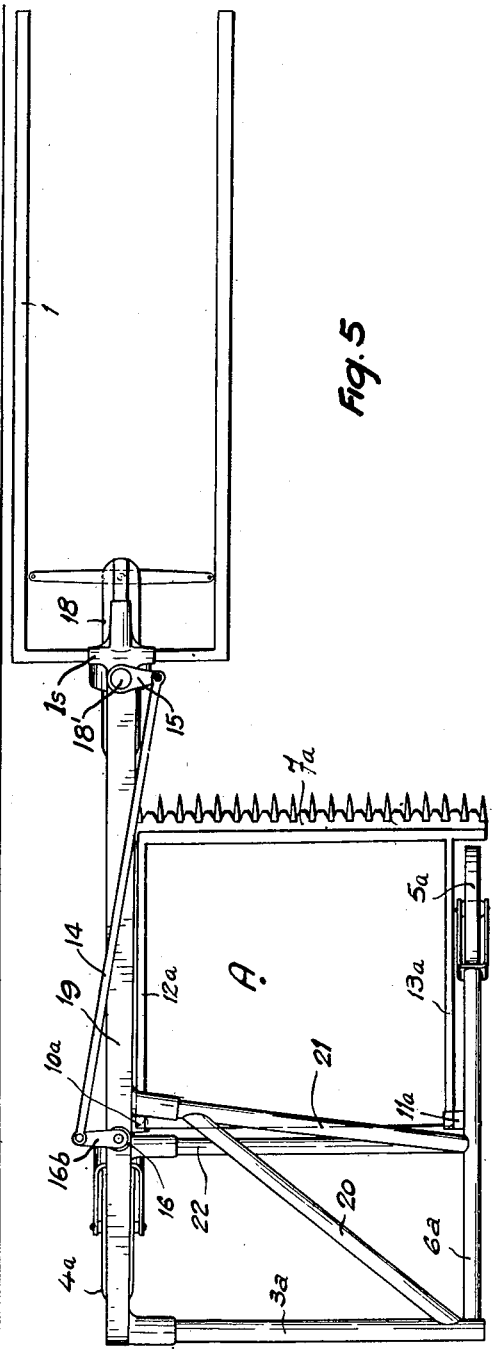
Inventor
Emile Bobard
by his attorneys
Howson and Howson Feb. 26, 1952 — E. BOBARD — 2,587,435
MOWING MACHINE
Filed March 15, 1945 — 4 Sheets-Sheet 3

Inventor
Emile Bobard
by his attorneys
Howson and Howson

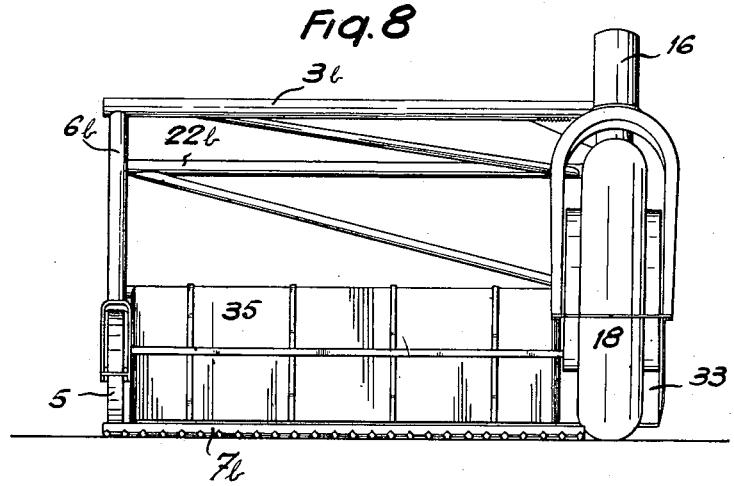
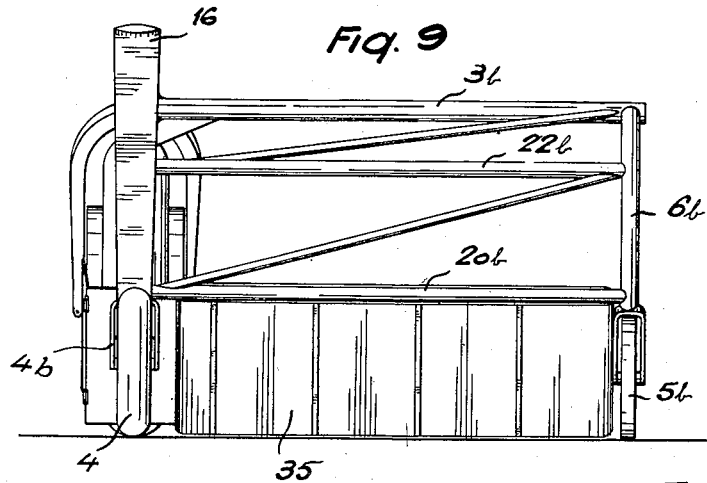

Patented Feb. 26, 1952

2,587,435

UNITED STATES PATENT OFFICE 2,587,435

MOWING MACHINE

Emile Bobard, Beaune, France

Application March 15, 1945, Serial No. 582,882
In France September 11, 1942

Section 1, Public Law 690, August 8, 1946
Patent expires September 11, 1962

2 Claims. (Cl. 56—265)

A mowing or a mowing-and-reaping machine generally comprises a cutter bar arranged horizontally in an overhung position with reference to the vehicle proper which is provided with two or three wheels and forms therefor certain obstruction because of its breadth. Consequently it is necessary when it is wished to begin operation, to previously reserve all round the field to be mowed, the space required for the passage of the wheeled frame of the machine. In practice, the cutting in this passage can only be performed with the scythe, which considerably reduces the efficiency of the mechanical mowing means, in the case of fields of small area. Such an operation is also necessary in the case of mowing machines wherein the cutting bar is held through both ends while the frame is symmetrical i. e. the draught animal is put to in the middle of the cutter bar.

My invention has for its object a mowing machine characterized by the combination of the two following features: on one hand, the two opposite wheels are connected transversely by a member located at a certain distance from the cutter bar either rearwards or upwards or both so as to leave above and behind said cutter bar a space sufficiently wide to allow the mowed stalks to fall properly behind the cutter bar, on the other hand the devices provided for draught purposes (shafts or driving wheels) are located at one side of the cutter bar so as to free the field area with reference to the draught devices.

Moreover the reaping and binding machines of known type comprise a transverse elevating conveyor which carries the mowed plants to the binding table arranged on the outside of the wheeled frame and which moves for this purpose above the large carrier wheel of the frame. The necessity of raising the crop above the wheel leads to giving the conveyor a needlessly long extension in the transverse direction, so as to avoid a too rapid slope and this contributes to the increase of the transverse bulk.

In accordance with my invention, the wheeled frame of the machine is raised, also in the longitudinal direction whereby it is possible to arrange without any difficulty, a binding table underneath said frame and as near the ground as may be desired. This consequently reduces to a strict minimum the length of the conveyor and thereby prevents the binding table from projecting laterally beyond the outer plane of the frame wheels. In this case, the frame is connected with the wheel carrying the end of the cutter bar through two members arranged respectively in a horizontal and in a vertical plane.

Appended drawings illustrate by way of example several forms of execution of my invention.

Figs. 1 to 3 show a sample mowing machine, Figure 1 being a top plan view, Figure 2 a side elevational view and Figure 3 a front view.

Figs. 4 and 5 show a mowing machine provided with three wheels and adapted for animal draught or to be self-propelled, Fig. 4 being a side elevational view and Fig. 5 a top plan view.

Figs. 6 to 9 show a self-propelled mowing machine, Fig. 6 being a top plan view, Fig. 7 a side elevational view and Figs. 8 and 9 front and rear end views respectively.

Figure 7:
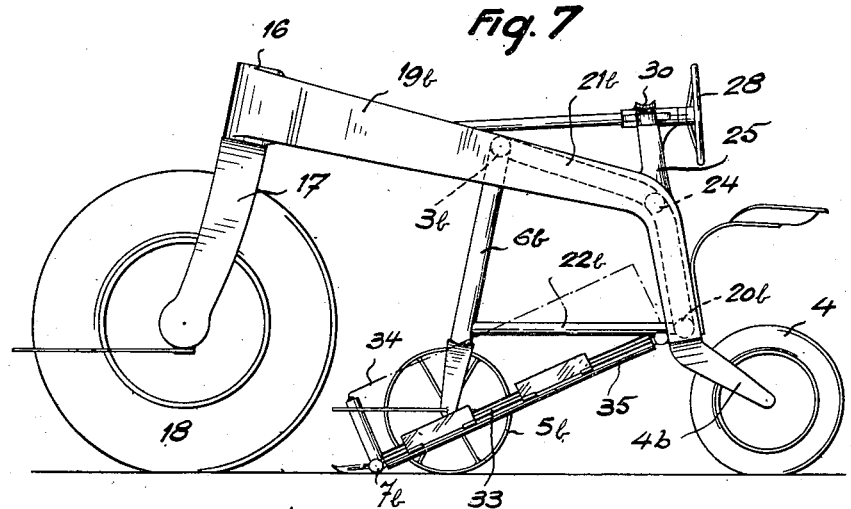

The mowing machine shown in Figs. 1 to 3 includes parallel shafts 1 connected by two cross-bars 2 and 3 which carry a wheel 4 through the interposition of a substantially vertical tube 4t. The rear cross-bar 3 extends laterally beyond the shafts 1.

To hold shafts 1 horizontally, feet 1x may be pivotally connected to brackets 1y mounted on the mid-portion of shaft 1. When not in use, the feet may be tied parallel to the shafts in any suitable way.

In conformity with the chief feature of the invention, the shafts 1 are arranged symmetrically with reference to the wheel 4. A second wheel 5 which provides for the stability of the vehicle frame is arranged at the end of the tubular cross bar 3 which is raised above the ground a distance at least equal to the height of the plants to be mowed. This second wheel 5 is, to this end, carried by another tube 6 which is substantially vertical and connected with the end of the cross bar 3. The tube 4a, cross bar 3 and tube 6 thus form a frame portion of inverted U-shape.

The mowing-bar proper 7 may thus be held rigidly at both ends while it is mostly to one side of the shafts 1. The two wheels 4 and 5 are, to this end, enclosed in the example shown, in two casings 8 and 9. To the rear ends of the casings are pivotally secured as at 10 and 11 the rear ends of parallel arms 12 and 13 whose front ends are rigidly secured to the cutter bar 7. The bar 7 may thus rest of its own weight on the ground, but may be raised manually when desired.

Due to this arrangement, the waste space, i. e. the space required next to the cutter bar is only the area required for the driving wheel 4 and the draught animal. It is thus possible to immediately begin mowing without any preliminary trimming of the periphery of the field to be reaped. The plants in the first cutting row fall freely behind the cutter bar. Moreover, during the mowing of the second cutting row, the swath cut down in the first row forms no hindrance as it is sufficient to make the wheel 4 pass along the edge of the second row, which removes the necessity of shifting the swaths through a hand-operation or a special mechanical device.

Figure 6:
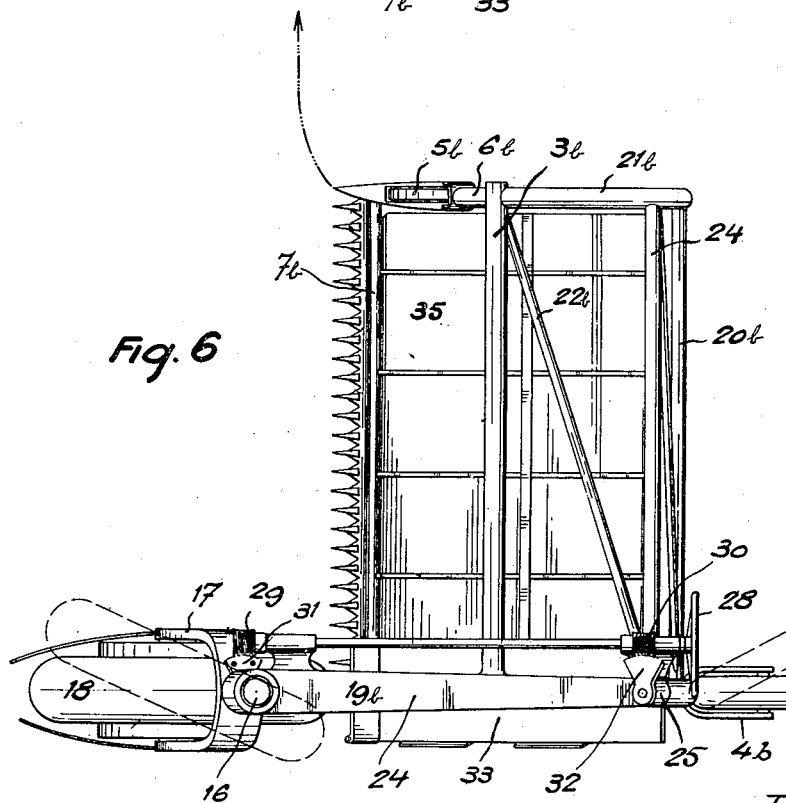

It will be noticed that this type of frame may be used as well in the case of a self-propelled vehicle as is illustrated, for example, in Figs. 6 and 7.

In the mowing machine illustrated in Figs. 4 and 5, the cutter-bar 7a is also held at both ends through arms 12a and 13a pivotally mounted at 10a and 11a. However, the pivotal axis 11 and the stabilising wheel 5a are carried by a tube 6a which, instead of being substantially vertical, slopes rearwardly and is coupled with a tube 3a which is itself mounted rearwardly of the cutter bar. The connection between the tube 6a and the main frame 19 carrying the forward wheel 18 and the rear wheel 4a may be reinforced by the tubes 20, 21 and 22 provided these tubes are also mounted with reference to the cutter bar either upwards or rearwards or both upwards and rearwards, so as to allow the cut plants to fall freely rearwards into the space left vacant at A.

In the example shown in Figs. 4 and 5, the wheel 4a is or may be self-propelling and is carried at the extremity of a pivoting fork 4b coupled with the steering tube 16a.

When the machine is to be animal-drawn, the parallel shafts 1 are moved from the broken line position of Fig. 4 to the full line position by swinging the shafts in vertical planes about their pivotal mounting in sleeve 1s which is located at the top of the steering column 18'. The movements of this steering column are transmitted to the rear wheel 4a by a link bar 14 pivotally connected at its front end to a lever arm 15 extending radially from the steering column, and at its rear end to a similar lever arm 15b extending from the steering column 16a of the rear wheel 4a.

Figs. 6 to 9 illustrate a self-propelled reaping and binding machine. In this machine also the cutter bar 7b is carried at each end by a member which is directed both upwards and rearwards. This member comprises a bar 6b carrying the carrier wheel 5b and three cross-bars 3b—20b—24 securing the lateral frame 6—21b—22b to the main frame 19b. The latter is constituted by a beam which is also raised above the ground and to the front of which is secured the steering tube 16 for the fork 17 of the steering and driving wheel 18. Said beam 19b is bent at its rear end to the shape of the frame tube 21 so as to carry the pivoting fork 4b of the rear carrier wheel 4x.

The two wheels 18 and 4x are controlled simultaneously here as in the preceding case, by means of a steering wheel and two worms of opposite pitches 29 and 30. These worms engage two sectors 31 and 32 under conditions such that these are caused to pivot in opposite directions and consequently allow the vehicle to turn almost round the wheel 5.

Beyond the advantages due to the shifting of the frame in the transverse direction, as disclosed hereinabove in the case of Figs. 1, 2, 3, 4 and 5, this longitudinally raised frame ensures the following advantages: the binding table 33, which can be employed to carry the usual mechanisms for pressing down, binding and rejecting as diagrammatically shown at 34, is arranged underneath the frame, as low as desired, and in the same plane as the slanting conveyor 35 on which the mowed stalks fall. This conveyor moves in its own plane, from right to left without any raising. This leads both to a reduction to a minimum of the transverse bulk of the machine, which is the chief objection to its practical use as a simple mowing machine, and to the omission of the work of raising all the crop which is to be carried to the binding table.

It will be noted also that this manner of carrying the apparatus through two alined wheels allows a distribution between these wheels of the driving stresses produced by the different reaping and binding parts.

I claim:

1. An agricultural machine having a cutter-bar extending transversely to the direction of mowing of the machine, and a binding table for the mowed plants, comprising a frame with a transverse portion of an inverted U shape supporting said cutter-bar at both ends within the U and forming a bridge above the crop, and said frame having a longitudinal portion extending above the crop and the binding table, and draft means mounted on said frame on one side of said cutter-bar.

2. An agricultural machine comprising a cutter-bar extending transversely to the direction of mowing of the machine, a binding table for the mowed plants, a frame having an inverted U-shaped portion extending transversely and supporting the cutter-bar at both ends from the bottom of the U, the cross part of the U being above the plants to be mowed thereby permitting the plants to fall freely behind the cutter-bar, said frame having a longitudinal portion at an elevation above the plants to be mowed and said binding table, and draft means mounted on said frame on one side of the cutter-bar.

EMILE BOBARD.

REFERENCES CITED

The following references are of record in the file of this patent:

UNITED STATES PATENTS

| Number | Name | Date |
|---|---|---|
| 871,835 | Wacek | Nov. 26, 1907 |
| 1,053,459 | Walter | Feb. 18, 1913 |
| 1,511,024 | Brown et al. | Oct. 7, 1924 |
| 1,948,927 | Lindgren et al. | Feb. 27, 1934 |
| 1,954,630 | Livesay | Apr. 10, 1934 |

FOREIGN PATENTS

| Number | Country | Date |
|---|---|---|
| 825,227 | France | Nov. 27, 1937 |